US010629095B2

United States Patent
Sachs et al.

(10) Patent No.: US 10,629,095 B2
(45) Date of Patent: Apr. 21, 2020

(54) TRAINING MANIKIN

(71) Applicant: Ambu A/S, Ballerup (DK)

(72) Inventors: Fabian Sachs, Essershausen (DE); Peter Aagaard Kristensen, Malov (DK); Christian Paul Ward, Humlebaek (DK)

(73) Assignee: AMBU A/S, Ballerup (DK)

( * ) Notice: Subject to any disclaimer, the term of this patent is extended or adjusted under 35 U.S.C. 154(b) by 0 days.

(21) Appl. No.: 16/077,924

(22) PCT Filed: Feb. 8, 2017

(86) PCT No.: PCT/DK2017/050030
§ 371 (c)(1),
(2) Date: Nov. 14, 2018

(87) PCT Pub. No.: WO2017/140317
PCT Pub. Date: Aug. 24, 2017

(65) Prior Publication Data
US 2019/0333411 A1  Oct. 31, 2019

(30) Foreign Application Priority Data
Feb. 15, 2016  (DK) .................................. 2016 70080

(51) Int. Cl.
G09B 23/28  (2006.01)
H04W 4/80  (2018.01)
(Continued)

(52) U.S. Cl.
CPC ............. G09B 23/288 (2013.01); G09B 5/02 (2013.01); H04L 67/42 (2013.01); H04W 4/80 (2018.02)

(58) Field of Classification Search
CPC .... G09B 23/28; G09B 23/281; G09B 23/283; G09B 23/285; G09B 23/286; G09B 23/288; G09B 23/30; G09B 23/34
See application file for complete search history.

(56) References Cited

U.S. PATENT DOCUMENTS 4,797,104 A   1/1989  Laerdal
5,195,896 A   3/1993  Sweeney et al.
(Continued)

FOREIGN PATENT DOCUMENTS

EP  0 560 440 A1   9/1993
EP  1 623 403 B1   11/2012
(Continued)

OTHER PUBLICATIONS

Examination Report issued by the Danish Patent and Trademark Office, dated May 23, 2016, for Danish Patent Application No. PA 2016 70080; 8 pages.
(Continued)

Primary Examiner — Omkar A Deodhar
(74) Attorney, Agent, or Firm — Faegre Baker Daniels LLP

(57) ABSTRACT

A training manikin comprising a plurality of sensors for registering training data pertaining to the per-formance of a trainee during use of the training manikin in a training session, a communication module for enabling a communication connection be-tween the training manikin and a user terminal with a display so that the training data can be displayed to a trainer in a training user interface on the display, characterized in that the training manikin comprises a server embedded in the training manikin and the server hosts a client-server application, said server is adapted to be accessed via the communication connection by a user client running on the user terminal and to communicate the client-server application to the user client, said client-server appli-
(Continued)

cation is configured to be executed by the user client and provide the training user interface on the display and to process the training data before displaying to the trainer in the training user interface.

18 Claims, 2 Drawing Sheets

(51) Int. Cl.
*G09B 5/02* (2006.01)
*H04L 29/06* (2006.01)

(56) References Cited

U.S. PATENT DOCUMENTS

| | | | |
|---|---|---|---|
| 5,312,259 | A | 5/1994 | Flynn |
| 5,853,292 | A | 12/1998 | Eggert |
| 6,205,415 | B1 | 3/2001 | Butts |
| 6,530,783 | B1 | 3/2003 | McGinnis |
| 7,223,103 | B2 | 5/2007 | Cantrell et al. |
| 2007/0264621 | A1 | 11/2007 | Nysaether et al. |
| 2009/0035740 | A1* | 2/2009 | Reed .................. G09B 23/288 434/265 |
| 2009/0148821 | A1 | 6/2009 | Carkner |
| 2009/0215011 | A1 | 8/2009 | Christensen |
| 2013/0218055 | A1* | 8/2013 | Fossan ................ G09B 23/288 601/41 |
| 2014/0272869 | A1 | 9/2014 | Hambelton |
| 2015/0325148 | A1 | 11/2015 | Kim |
| 2018/0303472 | A1 | 10/2018 | Matthison-Hansen et al. |

FOREIGN PATENT DOCUMENTS

| | | |
|---|---|---|
| GB | 791741 | 3/1958 |
| WO | WO 2004/100107 A1 | 11/2004 |
| WO | WO 2008/067295 | 6/2008 |
| WO | WO 2009/018334 | 2/2009 |
| WO | WO 2011/060350 | 5/2011 |
| WO | WO 2012/041759 A1 | 4/2012 |
| WO | WO 2012/141586 | 10/2012 |

OTHER PUBLICATIONS

Written Opinion of the International Searching Authority, dated Mar. 29, 2017, for International Patent Application No. PCT/DK2017/050030; 10 pages.

International Search Report, dated Mar. 29, 2017, for International Patent Application No. PCT/DK2017/050030; 4 pages.

Search Report in corresponding European Application No. 17 705 792.4, dated Oct. 8, 2019, 5 pages.

* cited by examiner

TRAINING MANIKIN

CROSS-REFERENCE TO RELATED APPLICATIONS

This is a § 371 application of International Application No. PCT/DK2017/050030, entitled "A Training Manikin," filed on Feb. 8, 2017, which claims the benefit of Danish Patent Application No. PA 2016 70080, filed Feb. 15, 2016; the full disclosures of which are expressly incorporated herein by reference in their entirety.

TECHNICAL FIELD

The present invention relates to a training manikin comprising a plurality of sensors for registering training data pertaining to the performance of a trainee during use of the training manikin in a training session, a communication module for enabling a communication connection between the training manikin and a user terminal with a display so that the training data can be displayed to a trainer in a training user interface on the display.

BACKGROUND OF THE DISCLOSURE

The benefits of training manikins enabled to communicate with a user terminal has been appreciated for years. It is well known to provide a medical training manikin with sensors for registering a trainee's performance during practice of for instance CPR or to continuously monitor and log parameters such as compression rate, compression depth, head position etc. It is common that the user terminal is a standard personal computer with an operating system installed. The manikin is provided with a communication module that enables the manikin to communicate via a communication connection that may be either cabled or wireless. A software application is installed on the user terminal to allow a trainer to setup and manage a communication connection between the user terminal and one or more training manikins, to prepare training sessions with different scenarios, to follow the trainee's performance during a training session, to log and later analyze the performance of a trainee. Such system is for instance known from expired U.S. Pat. No. 4,797,104.

Often a training manikin has a lifetime that is substantially much longer than the lifetime of a user terminal and the associated operating system. It is therefore a burdensome task to continuously update the software application in order to comply with the trainer's user terminal and the associated operating system throughout the lifetime of a training.

In practice it has shown to be a cumbersome task to setup a communication network and establish a communication connection between a user terminal and one or more training manikins. This is mainly due to changes in the technical properties of the user terminal and the associated operating system over time, but also due to slightly deviating standards for communication network devices that are used to enable the communication connection.

SUMMARY OF DISCLOSED EMBODIMENTS

Based on the above it is an object of the present invention to provide a training manikin, which facilitates the setup of a communication connection between a training manikin and a user terminal.

It is a further objective to provide a training manikin, which is independent of software applications installed on the operating system of the user terminal.

It is an even further object of the present invention to provide a training manikin, which facilitates the process of establishing a network connecting between a user terminal and a plurality of training manikins.

According to the present invention this object is achieved by a training manikin comprising a plurality of sensors for registering training data pertaining to the performance of a trainee during use of the training manikin in a training session, a communication module for enabling a communication connection between the training manikin and a user terminal with a display so that the training data can be displayed to a trainer in a training user interface on the display, characterized in that the training manikin comprises a server embedded in the training manikin and the server hosts a client-server application, said server is adapted to be accessed via the communication connection by a user client running on the user terminal and to communicate the client-server application to the user client, said client-server application is configured to be executed by the user client and provide the training user interface on the display and to process the training data before displaying to the trainer in the training user interface. This has multiple advantages. The client-server application which gives the user terminal the required functionality for setting up and running a training session is stored in the manikin and loaded into the user terminal that is used for control and monitor a training session. The user client is a purpose specific software application that can initiate communication sessions with servers, receive responses from the servers and interpret the responses and thereby display data from the server to the user. This allows the trainer to use any user terminal as long as it is able to communicate with via a communication connection and it has a user client with the capability described above. Preferably, the user client is web browser. It is also possible to update the client-server application without altering the user client installed on the user terminal and a user terminal may be user from training session to training session without requiring additional configuration and preparation by the user setting up and preparing a training session. Evidently, a user client may handle more than one communication connection at a time so the client-server application may be used for displaying training data and controlling more than one training manikin at a time. An important advantage of the invention is that one client-server application can be written and maintained to run across a range of differing hardware and software platforms, and that the client-server application is in the training manikin, not in the user terminal, so no software or hardware installation is required by the user.

In a practical embodiment according to the invention, the training manikin is configured as a master device that facilitates a communication network to enable communication connections between a user terminal and a plurality of training manikins configured as network slave devices so that the client-server application receives and displays training data from a plurality of training manikins. This makes it easier to setup a training session with more than one training manikin and to establish the communication connection between the user terminal and each of the training manikins used in a training session at a location without an existing communication network.

In a further developed embodiment the training manikin is configured to act as a wireless network access point that facilitates communication between a user terminal and a plurality of training manikins. This embodiment is a practical solution to avoid tedious cabling to the training manikins and the user terminal during a training session, but it also significantly lower the practical and physical requirement for setting up a training session.

In an even further developed embodiment, the communication module embedded in the training manikin comprises a dynamic host configuration protocol (DHCP) server and a domain name system (DNS) server.

In another embodiment according to the invention, the training manikin comprises a near field communication tag configured to connect a user terminal to the communication network facilitated by the master device.

In a practically preferred embodiment the user client is a web browser, said web browser continuously processes and displays training data in the training user interface. The use of a web browser as user client running on the user terminal or a similar application implementing web browser like functionalities makes the training manikin independent of the hardware and software of the user terminal. Since web browsers are designed to execute client-server application and because newer versions of web browsers are backward compatible to enable execution of legacy client-server applications, the training manikin benefits from the fact that practically all user terminals as default have a web browser installed as standard software. The client-server application is executed in a session of a web browser in order to obtain the desired functionality of the user terminal, i.e. to control the training manikin and to display training data during a training session.

In a further practical embodiment the training manikin comprises a near field communication tag configured to communicate the client-server application to the user client. If the user terminal is adapted enable near field communication this may even further facilitate setting up a training session and providing a user terminal with the functionality required to control and display a training session.

Since use of web browsers and uniform resource identifiers are customary among users of user terminals it is practical that the server is configured so that a predefined uniform resource identifier (URI) request from the user client initiates communication of the client-server application to the user client.

In an advantageous embodiment improving the performance of the communication module and the ability to function as wireless network access point, the communication module is interposed between two antenna modules.

In a practical embodiment a web socket server facilitating communication and real-time data between the communication module to the client-server application running in the user client is embedded in the communication module.

Another aspect of the invention relates to a method for configuring a training manikin system, said method comprises the steps of: providing a user terminal comprising a display and a user client, providing a plurality of training manikins, said training manikins comprises a plurality of sensors for registering training data pertaining to the performance of a trainee during use of the training manikin in a training session, a network communication module for enabling a communication connection between the training manikin and a user terminal with a display so that the training data can be displayed to a trainer in a training user interface on the display, configuring one of said training manikins as a master device, said master network device comprises a server adapted to be accessed via a communication connection by the user client running on the user terminal and to communicate the client-server application to the user client, said client-server application is configured to be executed by the user client and provide the training user interface on the display and to process the training data before displaying to the trainer in the training user interface, configuring the remaining of said training manikins as slave devices, running a user client on the user terminal, requesting the master network device to communicate the client-server application to the user client so that said client-server application is executed by the user client to provide the training user interface on the display and to process the training data from the plurality of training manikins before displaying to the trainer in the training user interface. In a practical embodiment the user terminal is a tablet device running a web browser, said tablet device comprises a touch sensitive display functioning as input device.

BRIEF DESCRIPTION OF THE DRAWINGS

The invention will now be described in based on non-limiting exemplary embodiments and with reference to the drawings, on which.

DETAILED DESCRIPTION

Figure 1:
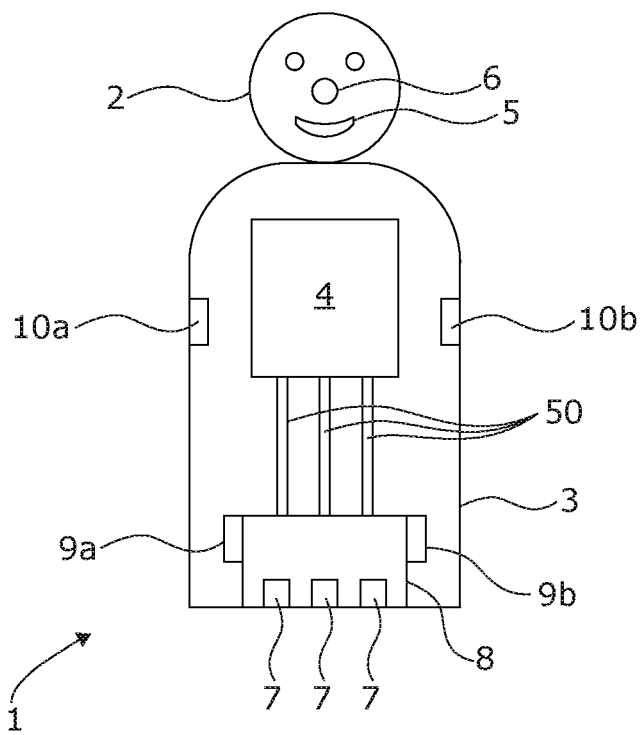
FIG. 1 schematically shows components inside of a training manikin according to the invention.

FIG. 1 shows a training manikin 1 for practicing cardiopulmonary resuscitation (CPR) that allows a trainee to practice chest compression and lung ventilation. The training manikin comprises a head 2 and a torso 3, which are required to practice CPR according to current guidelines. The torso 3 comprises a chest portion 4, which is configured simulate a patient's chest to allow compression during practice of chest compression. The chest portion 4 further comprises a lung portion (not shown), which is in fluid communication with a mouth 5 and nostrils 6 of the head 2. The lung portion and the mouth and nostrils simulates a patient's airways so as to allow practice of lung ventilation. The training manikin 1 is provided with a plurality of sensors 7 for registering sensor parameters such as lung ventilation volume, stomach inflation, compression depth, hand position on the chest, compression frequency during a training session, i.e. sensors and sensor parameters known by the skilled person in the art. Evidently, in a practical embodiment of the invention, the training manikin comprises a body structure which for instance is at least partly covered by a skin as known in the art by the person skilled in the art.

Figure 2:
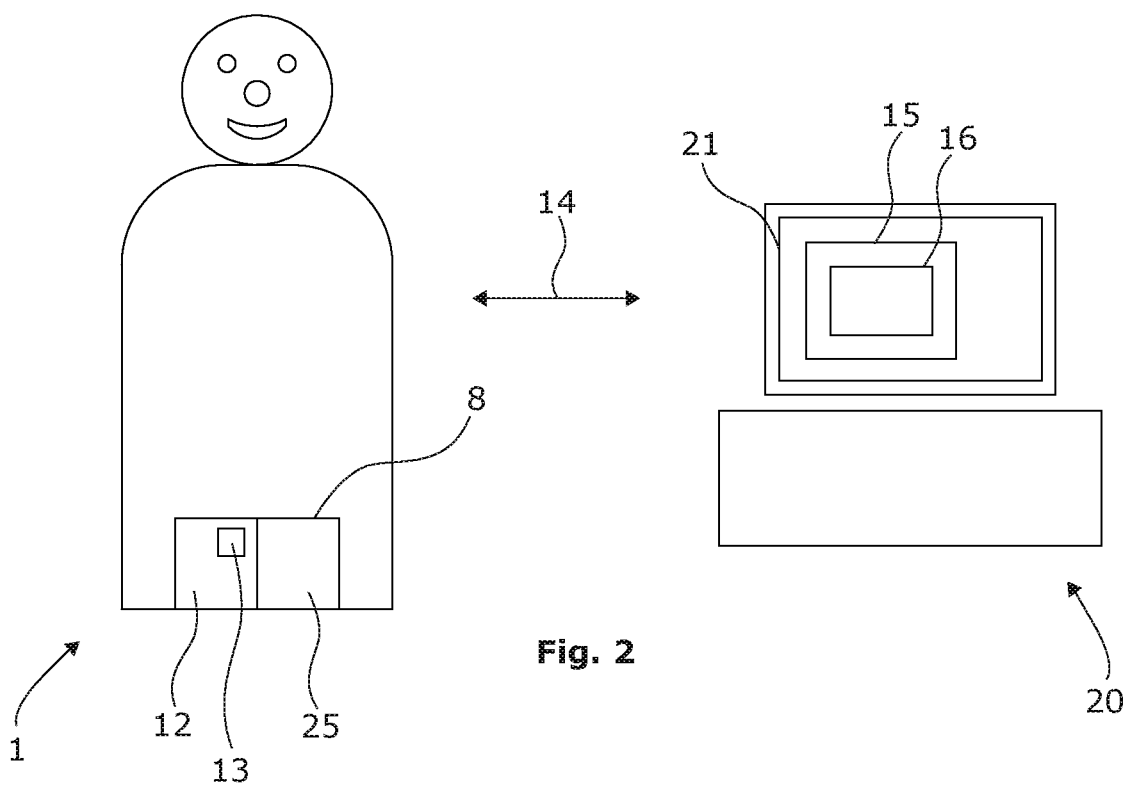
FIG. 2 is a further schematic drawing of a training manikin according to the invention.

The sensors 7 are positioned on or connected to a communication module 8 that will be described in further detail below. The sensors 7 are used for registering training data pertaining to the performance of a trainee during use of the training manikin in a training session. As shown in FIG. 2 the communication module 8 enables a communication connection 14 between the training manikin 1 and a user terminal 20 with a display 21 so that the training data can be displayed to a trainer in a training user interface 16 on the display 21.

The chest portion 4 and lung portion are connected to the sensors 7 positioned on or connected to the communication module 8, which preferably are optical sensors and magnets that detect movement of a mechanical rod mechanism 50 extending between the chest portion 4 to the communication module 8. The sensors 7 translate the movements of the chest portion 4 and lung portion into values that can be interpreted by the communication module 8. The communication module 8 is configured to enable communication with a user terminal 20 such as a personal computer or tablet device with a display 21 (cf. FIG. 2) and control peripherals such as a keyboard or a touch sensitive display. The communication module 8 comprises a circuit board comprising electronic circuitry including processing and storage means. Besides from enabling communication with a user terminal 20 or other training manikins according to the invention, the processing and storage means are used to process and store the sensor parameters registered by the sensors 7. The communication module 8 is a network enabled device running an operating system. A rechargeable battery stored in a battery compartment of the training manikin 1 powers the communication module 8. The communication module may also comprise non-volatile memory for storing information about use of the manikin, which can be used for determining and indicate in the display when a training manikin needs to undergo maintenance service. The communication module 8 is configured with a network communication module that enables wired local area network (LAN) and wireless local area network (WLAN) network communication, preferably via IEEE 802.3 Ethernet and IEEE 802.11 Wi-Fi. The training manikin is provided with a network socket for enabling wired network communication. As shown in FIG. 1 an antenna enabling the wireless network communication comprises two antenna modules 9a, 9b positioned on opposing sides of the training manikin 1. Generally, it is preferred that the respective antenna modules 9 of the network communication module are positioned in closest vicinity to opposing sides of the circuit board of the communication module 8. The training manikin may comprise one or more near field communication (NFC) tags 10a, 10b to facilitate initiation of a communication connection and exchange of data between a user terminal and the communication module 8 of a training manikin.

FIG. 2 shows another schematic drawing of a training manikin 1, which communicates with a user terminal 20 via a bi-directional communication connection 14. The schematic drawing of FIG. 2 illustrates two essential components of the communication module 8 according to the invention.

Firstly, the communication module 8 comprises a web server 12 that hosts a client-server application 13. The web server 12 is adapted to be accessed via the communication connection 14 by a user client 15 running on a user terminal 16 and to communicate the client-server application 13 to the user client 15. The user client 15 is a software application running on the user terminal 11, which application is configured to communicate with the web server 12 and execute the client-server application 13. The web server 15 may be implemented in JavaScript using Node.js framework. The client-server application 13 is a software application adapted to be hosted by a server and to be communicated to a user client 15 where it is executed to provide the training user interface on the display 21 and to process the training data before displaying to the trainer in the training user interface 16. When executed by a user client, the client-server application provides the user terminal with the ability to display and control a training session. The client-server application 13 may be implemented in HTML5 and JavaScript. In a practically preferred embodiment, the user client 15 is a web browser, because web browsers are known to be specifically developed to retrieve and present content from a web server 12. In the situation illustrated in FIG. 2, the content to be retrieved and presented is the client-server application 13.

When the client-server application 13 is executed by the user client 15, the training user interface 16 is displayed so that training data can be displayed to a trainer. Hence current training data can be displayed in real time or historic data can be retrieved and displayed. The user client 15 running the client-server application 13 receives the training data from the communication module 8 and processes it to display the performance of a trainee. The training user interface is also used to configure the training manikin prior to and during a training session. Inputs from the trainee are communicated back to the training manikin to allow various parameters to be changed on during a training session.

Once a communication connection 14 is established between the training manikin and the user terminal 20, a practically preferred way for the user client to retrieve the client-server application 13 from the web server is by sending a predefined uniform resource identifier (URI) request to the web server. In response, the web server returns the client-server application 13 to the user client 15, which is the executed and displayed by the user client 15 in the display 21 as schematically illustrated in FIG. 2. This has the advantage no additional software has to be installed on the user terminal 20, since only a web browser, which is a standard application with almost all operating systems used in user terminals, is required to run the client-server application. Moreover, new web browsers are generally backwards compatible with legacy web servers and client-server applications so future web browsers may be well suitable as user client. The client-server application is configured to be executed by the user client as described above so that it provides and displays the training user interface 16 on the display 21. Furthermore, the client-server application 13 running on the user terminal 20 facilitates communication with the communication module 8 so that training data may be received and processed before displaying to the trainer in the training user interface. Likewise, the training user interface 16 is used by the trainer for configuring and managing the training manikin.

If the user terminal is enabled for near field communication (NFC), the user terminal may retrieve the client-server application 13 by simply placing the user terminal in close vicinity to a NFC tag 10a, which is predefined to send the client-server application 13 to the user client upon communication between the NFC enabled user terminal and the NFC tag 10a. The user terminal 20 is configured to read the URI of the client-server application 13 from the NFC tag 10 and make a request to the web server 12 for the transfer of the client-server application 13 to the user terminal 20.

Secondly, the communication module 8 comprises an embedded web socket server 25, which handles the communication between the executed client-server application and the training manikin. The web socket server 25 implements the WebSocket protocol as defined in RFC 6455 so as to facilitate communication between the user client 20 and the communication module 8, i.e. allow real-time data transfer from the communication module 8 to the user client. But also to allow communication from the user client to the communication module 8 that can be used to alter the settings of the training manikin, i.e. to configure and manage the training manikin. The web socket server implements a standardized way to facilitate a communication connection between the user client and the communication module 8 so that communication messages may be passed back and forth between the user client and the communication module of the training manikin. In this way a bi-directional communication connection is established between the training manikin and the user terminal.

In a practical embodiment the communication module 8 is a computer device running an operating system. The operating system hosts the web server and the web socket server so that these servers are embedded in the communication module 8. Since the communication module 8 is positioned inside the training manikin, the servers are embedded in the training manikin. Evidently, the communication module 8 may be divided into separate physical entities that together perform the same functionality as described above. Likewise, the servers may be implemented and embedded in communication module 8 in various manners to perform the features described above and the above exemplary embodiment is only a practically preferred embodiment with separate web server and web socket server that has shown to be especially suitable to implement the features according to the invention. Therefore, the terms web server and web socket server refers to the features implemented in the communication module 8 of the training manikin according to the invention.

Figure 3:
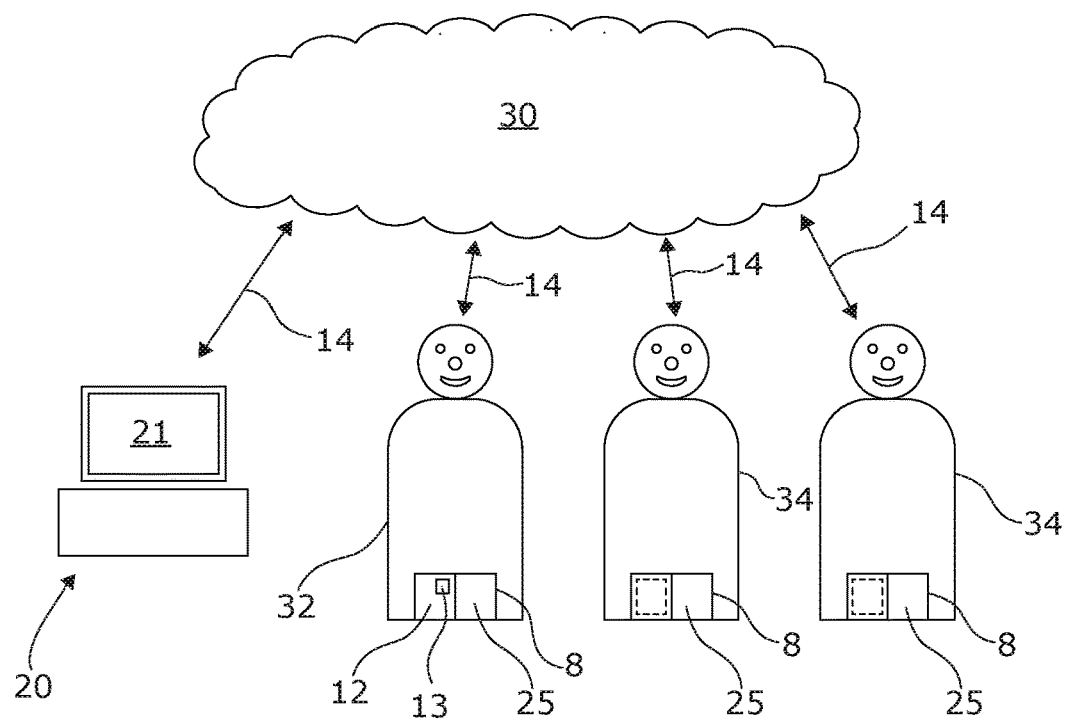
FIG. 3 illustrates a training manikin system comprising a plurality of training manikins according to the invention.

As mentioned above there must be a communication connection between the training manikin according to the invention and the user terminal in order to form a training manikin system. The training manikin and the user terminal may be connected in a cabled network by a direct cable between the network socket of the training manikin and a network socket of the user terminal or via a wireless connection. The communication connection 14 is used to access the client-server application 13 for execution in the user client 15 in order to configure the training manikin before a training session. As illustrated in FIG. 3 a training session may comprise a user terminal 20 and a plurality of training manikins 32, 34 all connected by communication connections 14 via an existing communication network 30 at the location where the training manikins are to be used. Each training manikin is configured before they are connected to the communication network. Besides from being configured to enable connection to the communication network 30, one of the manikins is selected and configured as master manikin 32 and the remaining of the manikins to be connected to the same network are identified and configured as slave manikins 34. Thereby the client-server application running in the user agent may receive training data and control both the master manikin 32 and the slave manikins 34 at the same time once connected to the same communication network. Configuration of the training manikins according to the invention is done via a configuration module in the training user interface of the client-server application executed by and running in the user client. It is preferred that training manikins according to the invention are configured as master manikin as the default configuration and that they are provided with a network reset switch. Further it is preferred that the setting of a training manikin is stored in a non-volatile memory until it is reconfigured, even if the if power is removed or the communication module 8 of the training manikin is restarted. Only the master manikin 32 is running the web server 12 when it is turned on and connected to the network 30. This is illustrated with the dotted boxes in the communication module 8 of the two slave manikins 34, which illustrates that they are only running the web socket server 21. In such a training manikin system the master manikin is the only manikin to respond with the client-server application 13 upon request from the user client. When the client-server application 13 has been executed by the user client 15, the client-server application 13 running on the user terminal is then communicate directly with the web socket server of the training manikins 32, 34 in order to receive and display training data. Optionally, a system using training manikins according to the invention may comprise further user terminals with a user client running the client-server application. The further user terminal may be used for only viewing a limited amount of training data, e.g. training data only pertaining to one training manikin or simply to facilitate a training session with more than one trainer present.

Figure 4:
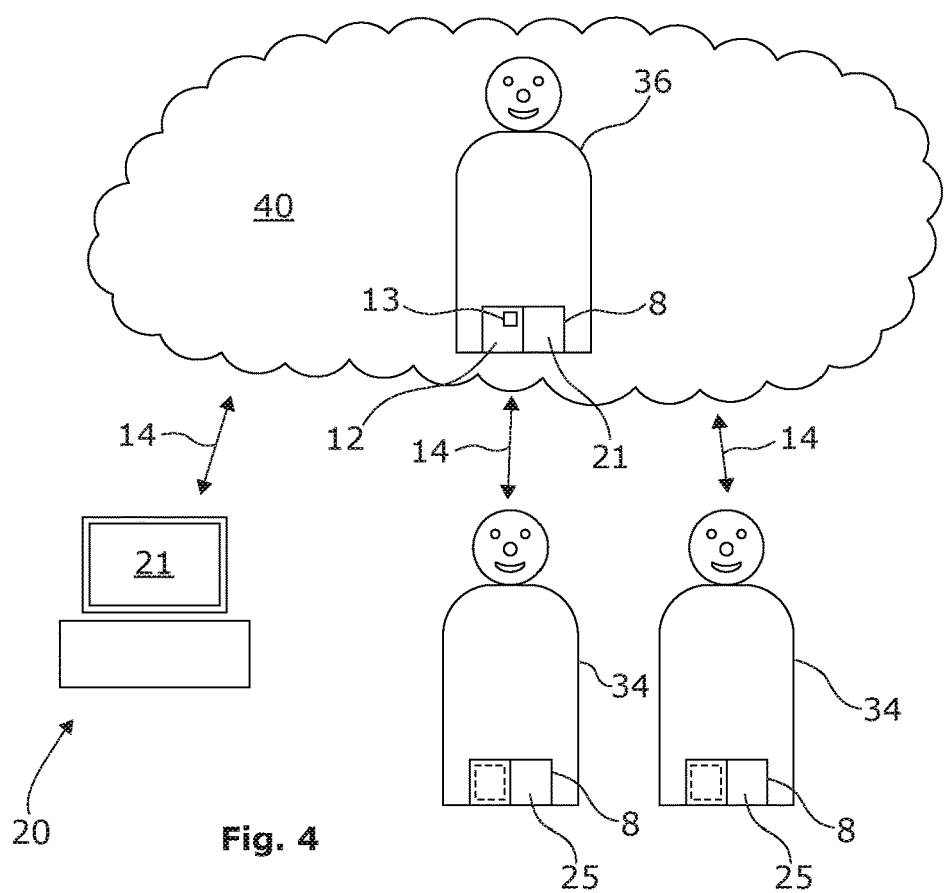
FIG. 4 illustrates an embodiment of a training manikin network according to the invention.

FIG. 4 illustrates a situation where is not an existing communication network at the location where the user client 20 and a plurality of training manikins 34, 36 are to be used, they can be connected in a wired network by means of a simple network device such as a network switch. In order to enable network communications between the user terminal 20 and the training manikins 34, 36, a master manikin 36 is configured to act as DNS server and DHCP server so as to establish a communication network 40. As in the embodiment of FIG. 3, only the master manikin runs a web server 12, whereas all training manikins run a web socket server. The communication network 40 established by the master manikin 36 may also be a wireless Wi-Fi access point provided by at least one of the antenna modules 9a, 9b. Evidently, if the master manikin 36 is turned off during a training session where it is used to establish a communication network 40, the connection between the user terminal and the other training manikins will be lost.

When the communication network 40 is not provided by a cabled network, but is a wireless communication network, the trainer would normally need to manually connect the user terminal to the wireless communication network. However, if the user terminal 20 is enabled for near field communication (NFC), the user terminal 20 may be connected to the wireless communication network by reading a NFC tag 10b placed on the training manikin. By reading the NFC tag 10, information about the communication network is provided to the user terminal to setup the network connection.

In a practical embodiment the training manikin may in a non-volatile manner in the communication module 8 store training manikin performance and usage data, including but not limited to, data retrieved from the sensors 7, data from a rechargeable battery and data from other relevant training usage parameters. The performance and usage data is used by the communication module 8 to determine a manikin state indication, which may be displayed to the user in the client-server application 13. The manikin state indication may be a simple colored indication in a portion of the display such as: green being "OK", amber being "attention needed soon" and red being "failure or loss of functionality". A notification message detailing where attention is required such as "battery failure" may be provided. In addition to providing a user indication in the client-server application, the performance and usage data can also be used by service centers for fault investigation, determination of likely component wear and future product improvements.

The skilled person will understand that many variations and deviations from the above exemplary embodiments are possible without parting from the gist of the invention.

We claim:

1. A training manikin comprising:
   a plurality of sensors for registering training data pertaining to the performance of a trainee during use of the training manikin in a training session,
   a communication module for enabling a communication connection between the training manikin and a user terminal with a display so that the training data can be displayed to a trainer in a training user interface on the display, and
   a server embedded in the training manikin, wherein the server hosts a client-server application and is adapted to be accessed via the communication connection by a user client running on the user terminal and to communicate the client-server application to the user client, wherein said client-server application is configured to be executed by the user client and provide the training user interface on the display and to process the training data before displaying to the trainer in the training user interface, and wherein the training manikin is configured as a master device that facilitates a communication network to enable communication connections between the user terminal and a plurality of training manikins configured as network slave devices so that the client-server application receives and displays training data from the plurality of training manikins.

2. A training manikin according to claim 1, wherein the training manikin is configured to act as a wireless network access point that facilitates communication between the user terminal and the plurality of training manikins.

3. A training manikin according to claim 1, wherein the communication module embedded in the training manikin comprises a DHCP server and a DNS server.

4. A training manikin according to claim 1, wherein the training manikin comprises a near field communication tag configured to connect the user terminal to the communication network facilitated by the master device.

5. A training manikin according to claim 1, wherein the user client is a web browser, and said web browser continuously processes and displays training data in the training user interface.

6. A training manikin according to claim 1, wherein the communication module is interposed between two antenna modules.

7. A method for configuring a training manikin system, said method comprises the steps of:
providing a user terminal comprising a display and a user client,
providing a plurality of training manikins, wherein each of said training manikins comprise a plurality of sensors for registering training data pertaining to the performance of a trainee during use of the training manikin in a training session, a network communication module for enabling a communication connection between the training manikin and a user terminal with a display so that the training data can be displayed to a trainer in a training user interface on the display,
configuring one of said training manikins as a master network device, wherein said master network device comprises a server adapted to be accessed via a communication connection by the user client running on the user terminal and to communicate the client-server application to the user client, and wherein said client-server application is configured to be executed by the user client and provide the training user interface on the display and to process the training data before displaying to the trainer in the training user interface,
configuring the remaining of said training manikins as slave devices,
running the user client on the user terminal, and
requesting the master network device to communicate the client-server application to the user client so that said client-server application is executed by the user client to provide the training user interface on the display and to process the training data from the plurality of training manikins before displaying to the trainer in the training user interface.

8. A method for configuring a training manikin system according to claim 7, wherein the user terminal is a tablet device running a web browser.

9. A training manikin according to claim 2, wherein the communication module embedded in the training manikin comprises a DHCP server and a DNS server.

10. A training manikin according to claim 9, wherein the training manikin comprises a near field communication tag configured to connect the user terminal to the communication network facilitated by the master device.

11. A training manikin according to claim 10, wherein the user client is a web browser, and said web browser continuously processes and displays training data in the training user interface.

12. A training manikin system comprising a training manikin including:
a plurality of sensors for registering training data pertaining to the performance of a trainee during use of the training manikin in a training session;
a client-server application adapted to present a training user interface on a user terminal having a display;
a communication module adapted to enable a communication connection between the training manikin and the user terminal; and
a server embedded in the training manikin, wherein the server hosts the client-server application and is adapted to be accessed via the communication connection by a user client running on the user terminal, and wherein the server is configured to communicate the client-server application to the user client,
wherein said client-server application is configured to be executed by the user client and provide the training user interface on the display and to present the training data with the training user interface.

13. The training manikin system of claim 12, further comprising a plurality of training manikins.

14. The training manikin system of claim 12, wherein the communication module embedded in the training manikin comprises at least one of a wireless network access point and DHCP and DNS servers, wherein the at least one of the wireless network access point and the DHCP and DNS servers is adapted to establish a communication network between the user terminal and a plurality of training manikins.

15. The training manikin system of claim 14, further comprising the plurality of training manikins.

16. The training manikin system of claim 14, wherein each of the plurality of manikins comprises a server hosting a client-server application and is adapted to be accessed via a communication connection with the user client, wherein the manikin is configured as a master device and each of the plurality of manikins is configurable as a master device or a slave device and is configured as a slave device, and wherein only the master device, and not the slave devices, is configured to communicate the client-server application to the user client.

17. The training manikin system of claim 12, further comprising a near field communication tag configured to connect the user terminal to the communication module.

18. The training manikin system of claim 12, wherein the user client is a web browser.

* * * * *